(12) United States Patent
Straus

(10) Patent No.: US 11,645,662 B2
(45) Date of Patent: *May 9, 2023

(54) DIGITAL SIGNAGE AND GAMING SERVICES TO COMPLY WITH FEDERAL AND STATE ALCOHOL AND BEVERAGE LAWS AND REGULATIONS

(71) Applicant: TOUCHTUNES MUSIC CORPORATION, New York, NY (US)

(72) Inventor: Stephen D. Straus, Austin, TX (US)

(73) Assignee: TOUCHTUNES MUSIC COMPANY, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,851

(22) Filed: Jun. 22, 2021

(65) Prior Publication Data
US 2021/0312473 A1 Oct. 7, 2021

Related U.S. Application Data

(63) Continuation of application No. 16/386,369, filed on Apr. 17, 2019, now Pat. No. 11,074,593, which is a (Continued)

(51) Int. Cl.
*G06Q 30/00* (2012.01)
*G06Q 30/02* (2023.01)
(Continued)

(52) U.S. Cl.
CPC ......... *G06Q 30/02* (2013.01); *G06Q 30/0241* (2013.01); *G06Q 30/0248* (2013.01);
(Continued)

(58) Field of Classification Search
CPC ................ G06Q 30/02–0277; G06Q 30/0601
See application file for complete search history.

(56) References Cited

U.S. PATENT DOCUMENTS 3,710,137 A 1/1973 Stephens, Jr.
3,807,541 A 4/1974 Kortenhaus
(Continued)

FOREIGN PATENT DOCUMENTS

AU 199954012 4/2000
CA 2119184 9/1994
(Continued)

OTHER PUBLICATIONS

U.S. Appl. No. 12/222,785, filed Aug. 15, 2008, 2010/0042505 U.S. Pat. No. 10,290,006, Digital Signage and Gaming Services to Comply With Federal and State Alcohol and Beverage Laws and Regulations.

(Continued)

*Primary Examiner* — Raquel Alvarez
(74) *Attorney, Agent, or Firm* — Nixon & Vanderhye, P.C.

(57) ABSTRACT

Methods and systems providing digital signage and interactive gaming services in compliance with federal and state laws and regulations are described. A service fee is collected from a retailer, and a service fee may or may not be collected from a retailer (e.g., a bar). An advertising fee is collected from a first advertising provider. The first advertising provider is involved in alcohol distribution/wholesaling or manufacturing. A second advertising fee from a second advertising provider is collected. The second advertising provider is involved in a non-alcohol related industry. A portion of a subscription fee is collected based on a separate source of fees (e.g., text message or jukebox fee) received from a patron. The message may contain information indicating that the patron wishes to pay a service fee. Revenue sharing is implemented by distributing a portion of the service fee to the retailer and distributing a portion of the (Continued)

advertising fee from the second advertising provider to the retailer in compliance with federal and state laws.

24 Claims, 4 Drawing Sheets

Related U.S. Application Data continuation of application No. 12/222,785, filed on Aug. 15, 2008, now Pat. No. 10,290,006.

(51) Int. Cl.
    *G06Q 30/0241*     (2023.01)
    *G06Q 30/0251*     (2023.01)
    *G06Q 30/0273*     (2023.01)
    *G06Q 30/0601*     (2023.01)

(52) U.S. Cl.
    CPC ..... *G06Q 30/0251* (2013.01); *G06Q 30/0252* (2013.01); *G06Q 30/0259* (2013.01); *G06Q 30/0273* (2013.01); *G06Q 30/0274* (2013.01); *G06Q 30/0277* (2013.01); *G06Q 30/0601* (2013.01)

(56) References Cited

U.S. PATENT DOCUMENTS

| | | |
|---|---|---|
| 3,982,620 A | 9/1976 | Kotenhaus |
| 4,008,369 A | 2/1977 | Theurer et al. |
| 4,064,362 A | 12/1977 | Williams |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,696,527 A | 9/1987 | Ding et al. |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,815,868 A | 3/1989 | Speicher |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| D327,687 S | 7/1992 | Arbitor |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| D332,096 S | 12/1992 | Wolff et al. |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Martin et al. |

(56) References Cited

U.S. PATENT DOCUMENTS

| | | |
|---|---|---|
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,590,318 A | 12/1996 | Zbikowski et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay et al. |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,704,146 A | 1/1998 | Herring et al. |
| 5,708,811 A | 1/1998 | Arendt |
| 5,712,976 A | 1/1998 | Falcon |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |

(56) References Cited

U.S. PATENT DOCUMENTS

| | | |
|---|---|---|
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,005 A | 9/1999 | Liu |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,026,168 A | 2/2000 | Li et al. |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,067,564 A | 5/2000 | Urakoshi et al. |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl et al. |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,146,210 A | 11/2000 | Cha et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,167,358 A | 12/2000 | Othmer et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempieman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,379,187 B2 | 4/2002 | Nishimatsu |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |

(56) References Cited

U.S. PATENT DOCUMENTS

| | | | |
|---|---|---|---|
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi et al. |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| D495,755 S | 9/2004 | Wurz et al. |
| 6,789,215 B1 | 9/2004 | Rupp et al. |
| 6,816,578 B1 | 11/2004 | Kredo et al. |
| 6,850,252 B1 | 2/2005 | Hoffberg |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,160,132 B2 | 1/2007 | Phillips et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| D560,651 S | 1/2008 | Berkheimer et al. |
| 7,347,723 B1 | 3/2008 | Daily |
| D566,195 S | 4/2008 | Ichimura et al. |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady et al. |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,522,631 B1 | 4/2009 | Brown et al. |
| 7,533,182 B2 | 5/2009 | Wurtzel et al. |
| 7,548,851 B1 | 6/2009 | Lau |
| 7,549,919 B1 | 6/2009 | Nathan et al. |
| 7,574,727 B2 | 8/2009 | Nathan et al. |
| 7,634,228 B2 | 12/2009 | White et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| 7,937,724 B2 | 5/2011 | Clark et al. |
| D642,553 S | 8/2011 | Nathan et al. |
| 7,922,178 B2 | 8/2011 | Nathan et al. |
| 7,992,178 B1 | 8/2011 | Nathan et al. |
| 7,996,873 B1 | 8/2011 | Nathan et al. |
| 8,015,200 B2 | 9/2011 | Seiflien et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| 8,165,318 B2 | 4/2012 | Nathan et al. |
| 8,214,874 B2 | 7/2012 | Nathan |
| D665,375 S | 8/2012 | Garneau et al. |
| 8,292,712 B2 | 10/2012 | Nathan et al. |
| 8,325,571 B2 | 12/2012 | Cappello et al. |
| 8,332,895 B2 | 12/2012 | Nathan et al. |
| 8,429,530 B2 | 4/2013 | Neuman et al. |
| 10,290,006 B2 | 5/2019 | Straus |
| 2001/0016815 A1 | 8/2001 | Takahashi et al. |
| 2001/0023403 A1 | 9/2001 | Martin et al. |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0018074 A1 | 2/2002 | Buil et al. |
| 2002/0032603 A1 | 3/2002 | Yeiser |
| 2002/0045960 A1 | 4/2002 | Phillips |
| 2002/0113824 A1 | 8/2002 | Myers |
| 2002/0116476 A1 | 8/2002 | Eyal et al. |
| 2002/0118949 A1 | 8/2002 | Jones et al. |
| 2002/0120925 A1 | 8/2002 | Logan |
| 2002/0123331 A1 | 9/2002 | Lehaff et al. |
| 2002/0129036 A1 | 9/2002 | Ho Yuen Lok et al. |
| 2002/0129371 A1 | 9/2002 | Emura et al. |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |

(56) References Cited

U.S. PATENT DOCUMENTS

| | | |
|---|---|---|
| 2003/0008703 A1 | 1/2003 | Gauselmann |
| 2003/0014272 A1 | 1/2003 | Goulet et al. |
| 2003/0018740 A1 | 1/2003 | Sonoda et al. |
| 2003/0027120 A1 | 2/2003 | Jean |
| 2003/0031096 A1 | 2/2003 | Nathan et al. |
| 2003/0037010 A1 | 2/2003 | Schmelzer |
| 2003/0041093 A1 | 2/2003 | Yamane et al. |
| 2003/0050058 A1 | 3/2003 | Walsh et al. |
| 2003/0064805 A1 | 4/2003 | Wells |
| 2003/0065639 A1 | 4/2003 | Fiennes et al. |
| 2003/0076380 A1 | 4/2003 | Yusef et al. |
| 2003/0088538 A1 | 5/2003 | Ballard |
| 2003/0093790 A1 | 5/2003 | Logan et al. |
| 2003/0101450 A1 | 5/2003 | Davidsson et al. |
| 2003/0104865 A1 | 6/2003 | Itkis et al. |
| 2003/0108164 A1 | 6/2003 | Laurin et al. |
| 2003/0135424 A1 | 7/2003 | Davis et al. |
| 2003/0144910 A1 | 7/2003 | Flaherty et al. |
| 2003/0163388 A1 | 8/2003 | Beane |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee et al. |
| 2003/0233469 A1 | 12/2003 | Knowlson |
| 2004/0010800 A1 | 1/2004 | Goci |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0145477 A1 | 7/2004 | Easter |
| 2004/0148362 A1 | 7/2004 | Friedman |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2004/0243482 A1 | 12/2004 | Laut |
| 2005/0034084 A1 | 2/2005 | Ohtsuki |
| 2005/0048816 A1 | 3/2005 | Higgins |
| 2005/0060405 A1 | 3/2005 | Nathan et al. |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0240661 A1 | 10/2005 | Heller et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen et al. |
| 2006/0062094 A1 | 3/2006 | Nathan et al. |
| 2006/0143575 A1 | 6/2006 | Sauermann |
| 2006/0227673 A1 | 10/2006 | Yamashita et al. |
| 2006/0239131 A1 | 10/2006 | Nathan et al. |
| 2006/0247064 A1 | 11/2006 | Nguyen et al. |
| 2006/0293773 A1 | 12/2006 | Nathan et al. |
| 2007/0025701 A1 | 2/2007 | Kawasaki et al. |
| 2007/0047198 A1 | 3/2007 | Crooijmans et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0220580 A1 | 9/2007 | Putterman |
| 2007/0247979 A1 | 10/2007 | Brillon et al. |
| 2008/0005698 A1 | 1/2008 | Koskinen |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1 | 10/2008 | Tooker et al. |
| 2008/0275771 A1 | 11/2008 | Levine |
| 2008/0301311 A1 | 12/2008 | Bestler |
| 2008/0305738 A1 | 12/2008 | Khedouri et al. |
| 2008/0317049 A1 | 12/2008 | Sinicrope |
| 2009/0006993 A1 | 1/2009 | Tuli et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0100092 A1 | 4/2009 | Seiflein et al. |
| 2009/0109224 A1 | 4/2009 | Sakurai |
| 2009/0128631 A1 | 5/2009 | Ortiz |
| 2009/0138111 A1 | 5/2009 | Mastronardi |
| 2009/0158203 A1 | 6/2009 | Kerr et al. |
| 2009/0168901 A1 | 7/2009 | Yarmolich et al. |
| 2009/0172565 A1 | 7/2009 | Jackson et al. |
| 2009/0177301 A1 | 7/2009 | Hayes |
| 2009/0234914 A1 | 9/2009 | Mikkelsen et al. |
| 2009/0240721 A1 | 9/2009 | Giacalone |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0298577 A1 | 12/2009 | Gagner et al. |
| 2009/0307314 A1 | 12/2009 | Smith et al. |
| 2009/0328095 A1 | 12/2009 | Vinokurov et al. |
| 2010/0042505 A1 | 2/2010 | Straus |
| 2010/0111489 A1 | 5/2010 | Presler |
| 2010/0131558 A1 | 5/2010 | Logan et al. |
| 2010/0211818 A1 | 8/2010 | Nathan et al. |
| 2010/0211872 A1 | 8/2010 | Rolston |
| 2010/0241259 A1 | 9/2010 | Nathan |
| 2010/0247081 A1 | 9/2010 | Victoria Pons |
| 2010/0269066 A1 | 10/2010 | Nathan |
| 2010/0299232 A1 | 11/2010 | Nathan et al. |
| 2010/0306179 A1 | 12/2010 | Lim |
| 2011/0055019 A1 | 3/2011 | Coleman |
| 2011/0066943 A1 | 3/2011 | Brillon et al. |
| 2011/0173521 A1 | 7/2011 | Horton et al. |
| 2011/0246517 A1 | 10/2011 | Nathan et al. |
| 2011/0270894 A1 | 11/2011 | Mastronardi et al. |
| 2011/0283236 A1 | 11/2011 | Beaumier et al. |
| 2011/0298938 A1 | 12/2011 | Nathan et al. |
| 2011/0304685 A1 | 12/2011 | Khedouri et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0123842 A1 | 5/2012 | Patel |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0240140 A1 | 9/2012 | Nathan |
| 2012/0323652 A1 | 12/2012 | Mastronardi et al. |
| 2013/0021281 A1 | 1/2013 | Tse et al. |
| 2013/0040715 A1 | 2/2013 | Nathan et al. |
| 2013/0044995 A1 | 2/2013 | Cappello et al. |
| 2013/0070093 A1 | 3/2013 | Rivera et al. |
| 2013/0091054 A1 | 4/2013 | Nathan et al. |
| 2014/0026154 A1 | 1/2014 | Nathan |
| 2019/0244221 A1 | 8/2019 | Straus |

FOREIGN PATENT DOCUMENTS

| | | |
|---|---|---|
| CN | 1340939 | 3/2002 |
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |

(56) References Cited

FOREIGN PATENT DOCUMENTS

| | | |
|---|---|---|
| DE | 19539172 | 9/1996 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 06-127885 | 5/1994 |
| JP | 07281682 | 10/1995 |
| JP | 07-311587 | 11/1995 |
| JP | 08-037701 | 2/1996 |
| JP | 08-279235 | 10/1996 |
| JP | 8274812 | 10/1996 |
| JP | 3034555 | 11/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2000-270314 | 9/2000 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2004-29459 | 1/2004 |
| JP | 2004-030469 | 1/2004 |
| JP | 2004-054435 | 2/2004 |
| JP | 2005-018438 | 1/2005 |
| JP | 2005-107267 | 4/2005 |
| JP | 2005-184237 | 7/2005 |
| JP | 2005-215209 | 8/2005 |
| JP | 2006-39704 | 2/2006 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102962 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-199775 | 8/2007 |
| JP | 2007-241748 | 9/2007 |
| JP | 2008-058656 | 3/2008 |
| JP | 2009-017529 | 1/2009 |
| JP | 2009-075540 | 4/2009 |
| JP | 2009-288702 | 12/2009 |
| TW | 514511 | 12/2002 |
| TW | M274284 | 9/2005 |
| TW | M290206 | 5/2006 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO93/021732 | 10/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 02/060546 | 8/2002 |
| WO | WO 02/095752 | 11/2002 |
| WO | WO 01/084353 | 1/2003 |
| WO | WO 2003/005743 | 1/2003 |
| WO | WO 03/069613 | 8/2003 |
| WO | WO 2004/029775 | 4/2004 |
| WO | WO 2005/026916 | 3/2005 |
| WO | WO 2005/052751 | 6/2005 |
| WO | WO 2006/014739 | 2/2006 |
| WO | WO 2006/056933 | 6/2006 |
| WO | WO 2006/106631 | 10/2006 |
| WO | WO 2006/138064 | 12/2006 |
| WO | WO 2007/069143 A2 | 6/2007 |
| WO | WO 2007/092542 | 8/2007 |
| WO | WO 2008-033853 | 3/2008 |
| WO | 2009/004531 | 1/2009 |

(56) References Cited

FOREIGN PATENT DOCUMENTS

| WO | WO 2011094330 | 8/2011 |
|----|---------------|--------|
| WO | WO 2013/040603 | 3/2013 |

OTHER PUBLICATIONS

U.S. Appl. No. 16/386,369, filed Apr. 17, 2019, 2019/0244221, Digital Signage and Gaming Services to Comply With Federal and State Alcohol and Beverage Laws and Regulations.
U.S. Appl. No. 09/583,863, filed Jun. 1, 2000, U.S. Pat. No. 7,992,178, Downloading File Reception Process.
U.S. Appl. No. 09/584,797, filed Jun. 1, 2000, U.S. Pat. No. 7,996,873, Remote Management System for at Least One Audiovisual Information Reproduction Device.
U.S. Appl. No. 09/621,677, filed Jul. 24, 2000, U.S. Pat. No. 8,074,253, Audiovisual Reproduction System.
U.S. Appl. No. 10/196,258, filed Jul. 17, 2002, 2003/0031096 U.S. Pat. No. 8,037,412, Pay-Per-Play Audiovisual System With Touch Screen Interface.
U.S. Appl. No. 10/661,811, filed Sep. 15, 2003, 2005/0060405 U.S. Pat. No. 9,646,339, Digital Downloading Jukebox System With Central and Local Music Server.
U.S. Appl. No. 10/965,742, filed Oct. 18, 2004, 2005/0073782 U.S. Pat. No. 8,189,819, Sound Control Circuit for a Digital Audiovisual Reproduction System.
U.S. Appl. No. 11/035,882, filed Jan. 18, 2005, 2005/0125833 U.S. Pat. No. 8,661,477, System for Distributing and Selecting Audio and Video Information and Method Implementing by Said System.
U.S. Appl. No. 11/185,974, filed Jul. 21, 2005, 2006/0018208 U.S. Pat. No. 8,103,589, Digital Downloading Jukebox System With Central and Local Music Servers.
U.S. Appl. No. 11/222,036, filed Sep. 9, 2005, 2006/0062094 U.S. Pat. No. 8,151,304, Digital Downloading Jukebox System With User-Tailored Music Management, Communications, and Other Tools.
U.S. Appl. No. 11/358,721, filed Feb. 22, 2006, 2006/0239131 U.S. Pat. No. 8,332,895, Digital Downloading Jukebox System With User-Tailored Music Management, Communications, and Other Tools.
U.S. Appl. No. 11/513,018, filed Aug. 31, 2006, 2006/0293773 U.S. Pat. No. 8,165,318, Process for Adjusting the Sound Volume of a Digital Sound Recording.
U.S. Appl. No. 11/624,008, filed Jan. 17, 2007, 2008/0171594 U.S. Pat. No. 9,330,529, Coin Operated Game Terminal.
U.S. Appl. No. 11/698,060, filed Jan. 26, 2007, 2007/0121430 U.S. Pat. No. 8,184,508, Intelligent Digital Audiovisual Playback System.
U.S. Appl. No. 11/714,868, filed Mar. 7, 2007, 2007/0160224 U.S. Pat. No. 8,428,273, Wireless Digital Transmission System for Loudspeakers.
U.S. Appl. No. 11/727,391, filed Mar. 26, 2007, 2007/0247979 U.S. Pat. No. 7,822,687, Jukebox With Customizable Avatar.
U.S. Appl. No. 11/730,449, filed Apr. 2, 2007, 2007/0204263 U.S. Pat. No. 8,032,879, System for Remote Loading of Objects or Files in Order to Update Software.
U.S. Appl. No. 11/902,658, filed Sep. 24, 2007, 2008/0086379 U.S. Pat. No. 10,373,420, Digital Downloading Jukebox With Enhanced Communication Features.
U.S. Appl. No. 11/902,790, filed Sep. 25, 2007, 2008/0168807 U.S. Pat. No. 9,171,419, Coin Operated Entertainment System.
U.S. Appl. No. 11/907,880, filed Oct. 18, 2007, 2008/0077962 U.S. Pat. No. 8,028,318, Remote Control Unit for Intelligent Digital Audiovisual Reproduction Systems.
U.S. Appl. No. 11/979,179, filed Oct. 31, 2007, 2008/0069545 U.S. Pat. No. 8,225,369, Home Digital Audiovisual Information Recording and Playback System.
U.S. Appl. No. 12/076,761, filed Mar. 21, 2008, 2008/0239887 U.S. Pat. No. 9,953,481, Jukebox With Associated Video Server.
U.S. Appl. No. 12/071,003, filed Feb. 14, 2008 2008/0137849 U.S. Pat. No. 8,214,874, Method for the Distribution of Audiovisual Information and a System for the Distribution of Audiovisual Information.
U.S. Appl. No. 12/078,989, filed Apr. 9, 2008, 2008/0195443 U.S. Pat. No. 11,049,083, Digital Downloading Jukebox System With Central and Local Music Servers.
U.S. Appl. No. 12/230,254, filed Aug. 26, 2008, 2009/0070341 U.S. Pat. No. 7,996,438, Device and Process for Remote Management of a Network of Audiovisual Information Reproduction Systems.
U.S. Appl. No. 12/232,869, filed Sep. 25, 2008, 2009/0037969 U.S. Pat. No. 8,127,324, Audiovisual Reproduction System.
U.S. Appl. No. 12/292,123, filed Nov. 12, 2008, 2009/0138111 U.S. Pat. No. 10,127,759, Process for Selecting a Recording on a Digital Audiovisual Reproduction System, and System for Implementing the Process.
U.S. Appl. No. 12/318,864, filed Jan. 9, 2009, 2009/0265734 U.S. Pat. No. 8,332,887, Systems and/or Methods for Distributing Advertisements From a Central Advertisement Network to a Peripheral Device via a Local Advertisement Server.
U.S. Appl. No. 12/458,372, filed Jul. 9, 2009, 2009/0282491 U.S. Pat. No. 8,726,330, Intelligent Digital Audiovisual Playback System.
U.S. Appl. No. 12/662,639, filed Apr. 27, 2010, 2010/0211818 U.S. Pat. No. 7,987,282, an Audiovisual Distribution System for Playing an Audiovisual Piece Among a Plurality of Audiovisual Devices Connected to a Central Server Through a Network.
U.S. Appl. No. 12/801,119, filed May 24, 2010, 2010/0279775 U.S. Pat. No. 8,469,820, Communication Device and Method Between an Audiovisual Information Playback System and an Electronic Game Machine.
U.S. Appl. No. 12/801,272, filed Jun. 1, 2010, 2010/0241259 U.S. Pat. No. 8,843,991, Audiovisual Reproduction System.
U.S. Appl. No. 12/801,744, filed Jun. 23, 2010, 2010/0269066 U.S. Pat. No. 8,275,668 Process for Ordering a Selection in Advance, Digital System and Jukebox for Embodiment of the Process.
U.S. Appl. No. 12/805,437, filed Jul. 30, 2010, 2010/0299232 U.S. Pat. No. 8,145,547, Method of Communications for an Intelligent Digital Audiovisual Playback System.
U.S. Appl. No. 12/805,992, filed Aug. 27, 2007, 2011-0066943 U.S. Pat. No. 8,473,416, Jukebox With Customizable Avatar.
"About Ecast", date unknown, leaflet.
"Darts Revolution Again", Replay Magazine, Mar. 1991, pp. 146-148.
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
"Foobar 2000 Evaluation Updated," MonkeyBiz, Aug. 3, 2008, 4 pages (with partial English translation). http://monkeybizinfo.blogspot.jp/2008/08/foobar2000.html.
Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Bonczek et al., "The DSS Development System", 1983 National Computer Conference, Anaheim, California, May 16-19, 1983, pp. 441-455.
Canadian Office Action Application No. 2, 881,533 dated Aug. 30, 2016.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.

(56) References Cited

OTHER PUBLICATIONS

Crutcher et al., "The networked video Jukebox", IEEE, Trans, on circuits and systems for video technology, vol. 4, No. 2, pp. 105-120, 1994.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
European Examination Report dated Aug. 16, 2016 issued in European Application No. 12 075 107.8.
European Search Report from EP 1 993 079.
European Search Report issued for European Application No. 08000845.1-1238/1962251, dated Apr. 3, 2009.
Examiner's Report in related Canadian Application No. 2,881,503 dated Mar. 17, 2016.
Fachbuch, "Unterhaltungselektronic von A-Z" gfu 1, VDE-Verlag GmbH, pp. 12-13, 1983-1984.
Gallardo et al., "Tangible Jukebox: back to palpable music", ACM TEI, pp. 199-202, 2010.
Gralla, "How the Internet Works", Millennium Ed., Que Corporation, Aug. 1999.
Grimes, Chapter 18, "Taking Advantage of Web-based Audio".
Hewlett-Packard Development Co; HP Open View Storage Data Protector Admin's Guideline Manual Edition; May 2003; Copyright 2003, 60 pages http://h20000.www2.hp.com/bc/docs/support/SupporMannal/c006637931/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
ITouch 27 New Games brochure, JVL Corporation, 2005, 2 pages.
ITouch 8 Plus brochure, JVL Corporation, 2005, 2 pages.
Japanese Office Action issued in JP Application No. 2015-165266 dated Oct. 18, 2016.
Johnny Rockets Name That Tune [online], [retrieved Mar. 7, 2002]. Retrieved from the Internet: <http://www.johnnyrockets.com/docs/funstuff.html>.
Koskelainem, "Report on Streamworks™".
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Merriam Webster's Collegiate Dictionary, Ninth Edition, Merriam Webster, Inc., p. 1148, 1986 (definition of "Stand").
Merriam Webster's Collegiate Dictionary, Tenth Edition, Merriam-Webster, Inc., p. 361 (definition of dynamically).
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, 2002.
Office Action in related U.S. Appl. No. 12/929,466 dated Apr. 14, 2016.
Office Action in related U.S. Appl. No. 11/902,658 dated Jun. 29, 2016.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), Oct. 27 1 JP 07 281682, figure 1-6 abrége.
Peter Pawlowski, "Basic Player Whose Appearance and Functions can be Customized Freely 'Foobar 2000' v1.0 is Unveiled,"Windows Forest, Japan, Jan. 12, 2010, 3 pages (with partial English translation). http://forest.impress.co.jp/docs/news/20100112_341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
Stevens, "TCP/IP Illustrated: vol. 1, the Protocols".
Stewart, "Ecast Deploys Marimba's Castanet to Power an Internet-Based, Entertainment Management System for the Out-of-Home Market", Marimba, Press Release, 3 pages, www.marimba.com/news/releases/ecast.decl3.html, Dec. 13, 1999.
Strauss et al., "Information Jukebox a semi public device for presenting multimedia information content", Pers. Ubiquit Comput, 7, pp. 217-220, 2003.
Tom & Liz's Name That Tune [online], [retrieved Jul. 23, 2001]. Retrieved from the Internet: <http://home.att.net/~tomnliz/Music.html>.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Yuki Murata, iTunes no 'Kankyo Settei' Catalog & Tips 10 Sen, Mac People, ASCII Corporation, Oct. 1, 2007.

DIGITAL SIGNAGE AND GAMING SERVICES TO COMPLY WITH FEDERAL AND STATE ALCOHOL AND BEVERAGE LAWS AND REGULATIONS

CROSS-REFERENCE TO RELATED APPLICATION

This application is a Continuation of U.S. patent application Ser. No. 16/386,369 filed Apr. 17, 2019, which is a Continuation of U.S. patent application Ser. No. 12/222,785 filed Aug. 15, 2008, now U.S. Pat. No. 10,290,006, issued May 14, 2019, the entire contents of each of which are hereby incorporated by reference.

TECHNICAL FIELD

Certain exemplary embodiments of this invention relate to digital signage and interactive gaming. More particularly, certain exemplary embodiments relate to methods and systems for implementing a business model for digital signage and interactive gaming services in compliance with federal and state laws and regulations related to alcohol distribution.

BACKGROUND AND SUMMARY

It is desirable to provide entertainment content such as interactive gaming services and digital signage to certain businesses. Businesses requiring these services may be involved with retail establishments in the restaurant and bar business sector that typically serve alcoholic beverages. However, federal and state laws and regulations restrict the amount of interaction between alcohol retailers, alcohol distributors/wholesalers, and alcohol manufacturers. Indeed, such laws and regulations prohibit vertical integration between the various tiers of the system for alcohol distribution. Because of the numerous restrictive laws and regulations that often vary from state-to-state and with the federal government, it has not been possible to provide entertainment content such as interactive gaming services and digital signage to businesses when such entertainment content involves interactions between alcohol retailers, alcohol distributors/wholesalers, and alcohol manufacturers on the one hand, and alcohol retail establishments on the other. Indeed, such restrictive laws and regulations make it difficult even to advertise alcohol-related promotions.

A provider of aggregated content including interactive gaming services and digital signage may implement a revenue sharing model to create incentives for the retail establishment to display such content. Digital signage provides a way for displaying advertisements in a relatively low-cost manner without the typical costs associated with traditional advertising. Advertisements at the national level provided by an advertising provider (e.g., a party not involved with the manufacturing or distribution/wholesaling of alcohol) may then be distributed to retailers to increase advertisement penetration at a local level. The fees collected from these advertising providers (e.g., a party not involved with the manufacturing or distribution/wholesaling of alcohol) may then be shared with retailers to provide incentives for displaying the aggregated content.

The above-noted laws and regulations have presented numerous legal (e.g., compliance) and technical issues that have prevented advertisers, retailers, and alcohol retailers, distributors/wholesalers, and alcohol manufacturers from realizing the full benefits of advertising. For example, the above-noted laws and regulations make it illegal for revenue sharing to be implemented between the parties, for promotions to be run at the retailers on behalf of the alcohol providers, etc. Thus, it will be appreciated that there is a need in the art for techniques that comply with the various applicable federal and state requirements, while also providing some or all of the benefits of advertising, where legal. For example, there is a need in the art for techniques that comply with the various applicable federal and state requirements, while also providing aggregated content. In light of the above-noted federal and state laws related to alcohol distribution, the inventor of the instant invention has discovered that it is possible for aggregated content providers to ensure that revenues from fees collected from alcohol advertisers are not shared with any retailer involved with selling alcoholic beverages as a means of providing advertising and enabling revenue sharing, while also complying with the various applicable federal and state laws. Accordingly, certain exemplary embodiments relate to techniques for ensuring compliance with these federal and state laws and regulations related to alcohol distribution when using digital signage, in a manner that provides some or all of the benefits associated with the same, where legal.

In certain exemplary embodiments, a method and system for providing digital signage are described. In certain exemplary embodiments, the method comprises: receiving advertisements at a data center, where the advertisements to be displayed are based on receipt of advertising fees, wherein at least one of the advertisements is a alcoholic beverage advertisement; sending at least one advertisement from the data center to a display processor via a packet data network; integrating the advertisement in a display window with video using the display processor such that the advertisement appears on a portion of a display in a retail establishment of a retailer while the video is playing and the retail establishment is selling alcoholic beverages and while complying with legal regulations relating to alcoholic beverages.

BRIEF DESCRIPTION OF THE DRAWINGS

These and other features, aspects, and advantages of the instant invention will be further understood by review of the following detailed description of the exemplary embodiments when read in conjunction with the appended drawings, in which.

DETAILED DESCRIPTION

Certain exemplary embodiments relate to a method and system for displaying advertising and/or other content using digital signage in establishments that sell and serve alcoholic beverages while complying with federal and state alcohol laws and regulations. For example, these laws may be Tied House Laws dealing with on-premises consumption. In certain exemplary embodiments, the system includes a data center to aggregate messages received from retailers and advertising providers to push content in an aggregated form to be displayed at the retailers. A display server hosted by the retailer is then used to overlay the aggregated messages from the data center with a video feed provided by a cable/satellite box. The patrons may then send messages to the data center based on the aggregated content displayed at the retailer to log-in and play to interactive gaming services provided by the data center.

Overview

Figure 1:
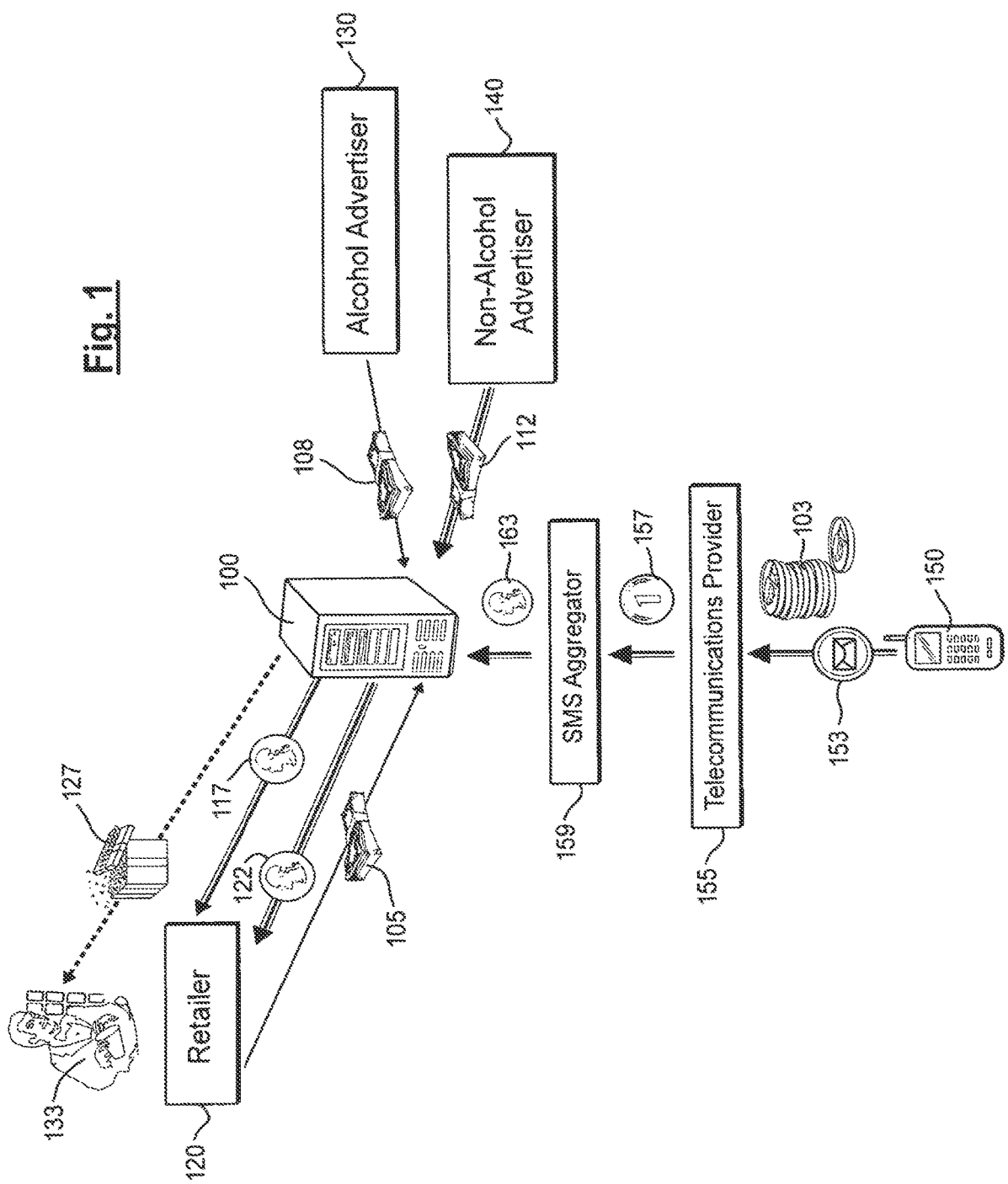
FIG. 1 is a data flow diagram of an exemplary embodiment of a process for providing content (e.g., advertisements) as part of digital signage and interactive gaming services in compliance with federal and state alcohol and beverage laws and regulations.

Referring now more particularly to the drawings in which like reference numerals indicate similar components throughout the several views, FIG. 1 is a flow diagram illustrating an exemplary embodiment of a process for providing content (e.g., advertisements) to be displayed using digital signage in compliance with federal and state alcohol and beverage laws and regulations. In certain exemplary embodiments, retailer 120 subscribes to a service provided by data center 100. Retailer 120 may comprise a bar establishment that serves alcoholic beverages and may provide entertainment to clientele including patron 150. Data center 100 may provide interactive gaming and digital signage services for retailer 120. Data center 100 then collects fees via, for example, electronic money transfer from patrons for a collection of services provided by data center 100. For example, data center 100 may provide content including interactive games, messages, and/or advertisements for patrons in the retail establishment of retailer 120. Retailer 120 may then offer these services to customers (e.g., patrons of the bar establishment). For example, retailer 120 may offer an interactive trivia game for a predetermined fee by displaying digital signage to a patron (e.g., patron 150, at the retail establishment of retailer 120). In this manner, the patron may subscribe to the offered service by sending a message 153 to data center 100.

In certain exemplary implementations, patron 150 sends message 153 including subscription information to be received by data center 100. Patron 150 may be a user using a mobile device with SMS capability. Message 153 may be, for example, an SMS message including subscription information sent from the mobile device. The subscription information in message 153 may represent data for indicating that patron 150 is subscribing to the service provided by data center 100. To receive message 153, data center 100 may be a subscriber of services provided by service providers 155 and 159. Message 153 may be sent over a network provided, in part, by service provider 155.

In certain exemplary embodiments, service provider 155 comprises a telecommunications provider that provides a wireless network for transmitting SMS messages. Patron 150 is charged a fee based on the content of the subscription information in message 153. For example, patron 150 may subscribe to an interactive game provided by data center 100 for a predetermined fee 103. Data center 100 sends information to service provider 155 indicating the predetermined fee 103 to be charged and collected from patron 150. Service provider 155 may then collect a portion of the predetermined fee 103 to be distributed to service provider 155 in exchange for transmitting message 153.

In certain exemplary embodiments, service provider 159 may receive message 153 from service provider 155. Service provider 159 may be an SMS aggregator service that functions as an intermediary for service provider 155 and data center 100. In certain exemplary embodiments, service provider 159 aggregates SMS messages sent by patron 150 and other patrons using one or more cell phone providers and forwards the messages to data center 100. Service provider 159 may then collect a portion of a remaining predetermined fee 157 (e.g., a remaining portion of the predetermined fee 103 less the portion distributed to service provider 155) to be distributed to service provider 159 in exchange for aggregating message 153 and messages from other patrons.

In certain exemplary embodiments, data center 100 then receives message 153 forwarded from service provider 159. A remaining predetermined fee 163 (e.g., a remaining portion of the predetermined fee less the portion distributed to service provider 155 and less the portion distributed to service provider 159) then may be collected by and distributed to data center 100. Remaining predetermined fee 163 comprises revenue that data center 100 collects from patron 150. Under the business model, data center 100 may then distribute a portion 117 of the remaining predetermined fee 163 to retailer 120. In this manner, data center 100 may implement revenue sharing with retailer 120 based on fees collected from patrons.

In certain exemplary embodiments, data center 100 receives advertising fee 108 collected from alcohol advertiser 130. Alcohol advertiser 130 comprises, for example, an alcohol beverage manufacturer or an alcohol beverage distributor/wholesaler. In certain exemplary embodiments, data center 100 receives advertising fee 112 collected from non-alcohol advertiser 140. Non-alcohol advertiser 140 may comprise any advertiser that does not include a type of alcohol beverage manufacturer or alcohol beverage distributor/wholesaler. In certain exemplary embodiments, data center 100 shares revenue with retailer 120 taken from a portion of the collected fees from patrons and advertisers. However, revenue sharing is restricted by federal and state laws and regulations when it relates with alcohol distribution. To help ensure compliance with these laws and regulations, data center 100 does not share and/or prevents the sharing of revenue from advertising fee 108 collected from alcohol advertiser 130 with retailer 120. In other words, using data center 100, the business model of certain exemplary embodiments prevents the commingling of revenue from fees collected from alcohol advertisers to be shared with retailers. In contrast, data center 100 may share revenue with retailer 120 collected from the fees from patron 150 and non-alcohol advertiser 140. In addition, data center 100 collects a fee from retailer 120 to comply with these federal and state laws and regulations. In certain exemplary embodiments, data center 100 collects a service fee 105 from retailer 120. Without collecting the service fee 105 from retailer 120 under the revenue sharing business model, in effect, alcohol advertiser 130 would be providing a service to retailer 120 that may be considered of value in certain states in violation of state laws and regulations for alcohol distribution.

In certain exemplary embodiments, data center 100 distributes a portion 122 of the revenue from advertising fee 112 collected from non-alcohol advertiser 140 to retailer 120. Data center 100 may also distribute a portion 117 of the revenue from collected from subscriber 150 to retailer 120. In certain exemplary embodiments, data center 100 distributes non-monetary compensation 127 to employee 133 of retailer 120. Employee 133 may include a bartender or a member of the wait staff employed by retailer 120. Monetary and non-monetary compensation 127 may comprise merchandise, tips, and other benefits distributed to employee 133 (as long as the compensation is not in violation of other laws).

System for Digital Signage and Interactive Gaming Services

Figure 2:
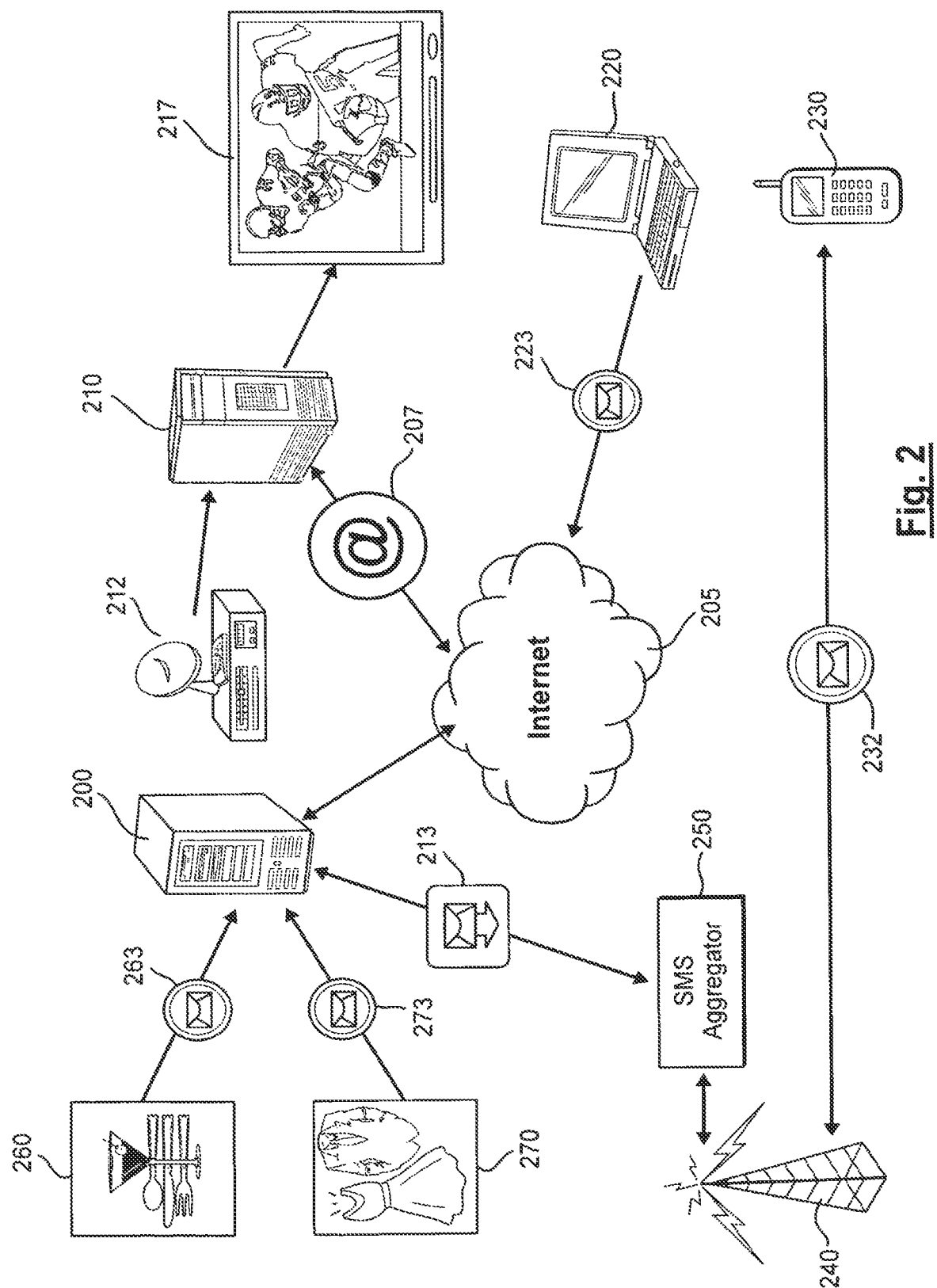
FIG. 2 is a diagram illustrating an exemplary embodiment of a system for digital signage and interactive gaming services.

FIG. 2 is a diagram of an exemplary embodiment of a system for digital signage and interactive gaming services. In certain exemplary embodiments, data center 200 provides digital signage content and interactive gaming services for patrons. Data center 200 typically comprises at least one computer system. Data center 200 is coupled to communicate over a network, such as Internet 205. Internet 205 as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

In certain exemplary embodiments, a retailer 120 (e.g., a bar establishment) uses remote client 220 for sending message 223 to data center 200 for processing. Remote client 220 may be a computer system configured to communicate over Internet 205 with data center 200. Message 223 may include content to be displayed on display 217. Display 217 may be a cathode ray tube (CRT) or liquid crystal display (LCD) or any other known display technology in the art. In certain exemplary embodiment, display 217 is a conventional television that accepts a video signal from display server 210. Display server 210 is typically a computer system located at the retailer's site and is coupled to communicate over Internet 205 with data center 200. Display server 210 also is communicably coupled to cable/satellite box 212 or other video source for accepting a video feed provided by cable/satellite box 212. Cable/satellite box 212 is typically a set-top box operable to transmit video feed from a television provider or cable operator that provides content and programming for television video. Display server 210 may transmit a video signal comprising aggregated content to be displayed on display 217. The aggregated content to be displayed may include a video signal comprising digital signage played on the same screen at the same time the video feed provided by cable/satellite box 212 is displayed, where the simultaneous display is done in a manner well-known in the art. In this manner, display server 210 may transmit aggregated content combined from various content providers to be displayed on display 217.

In certain exemplary embodiments, advertising provider 260 sends advertising message 263 to data center 200. Advertising provider 260 may comprise an alcohol manufacturer or alcohol distributor/wholesaler that subscribes to services provided by data center 200. For example, data center 200 may provide a service to display advertising messages from advertising provider 260 in local retail establishments. In this manner, advertising content from a national level may be distributed to the local level with relative ease. In certain exemplary embodiments, advertising provider 270 sends advertising message 273 to data center 200. Advertising provider 270 may comprise a non-alcohol related business that also subscribes to services provided by data center 200. For example, advertising provider 270 may include a clothes manufacturer, a retail chain, sports memorabilia manufacturer, or sports franchise. In this manner, data center 200 may have patrons involved in alcohol distribution and patrons not involved with alcohol distribution.

In certain exemplary embodiments, subscriber 230 may send message 232 over a network provided by service provider 240. Subscriber 230 may be using a mobile device with SMS capability for sending messages over the network. Service provider 240 may be a telecommunications provider that provides communications services for subscriber 230. In certain exemplary embodiments, service provider 240 may then forward message 232 to SMS aggregator 250. SMS aggregator 250 typically provides a service to receive SMS messages from various different service providers and forwards the messages to a subscriber of the SMS aggregator service, which is data center 200 in this case. SMS aggregator 250 may then forward message 232 to data center 200 for processing. Data center 200 may provide a service to subscriber 230 based on the information in message 232. Data center 200 may then transmit response message 213 to subscriber 230 in response to message 232. Response message 213 may comprise a confirmation message acknowledging that subscriber 230 has successfully subscribed to the service provided by data center 200.

In certain exemplary embodiments, data center 200 may combine advertising message 263, advertising message 273, and message 223 to be transmitted as an aggregated message 207 to display server 210. Data center 200 acts as a "hub" for the "spokes" including the various providers of content. Data center 200 may then segregate and process the messages received from these various providers of content in a manner compliant with federal and state laws and regulations related to alcohol distribution. After receiving aggregated message 207, display server 210 processes aggregated message 207 to display the content in aggregated message 207 on the same screen at the same time as the video feed received from cable/satellite box 212. In this manner, aggregated content comprised of the video feed from cable/satellite box 212 and aggregated message 207 is displayed on display 217.

Method for Displaying Aggregated Content for Digital Signage

Figure 3:
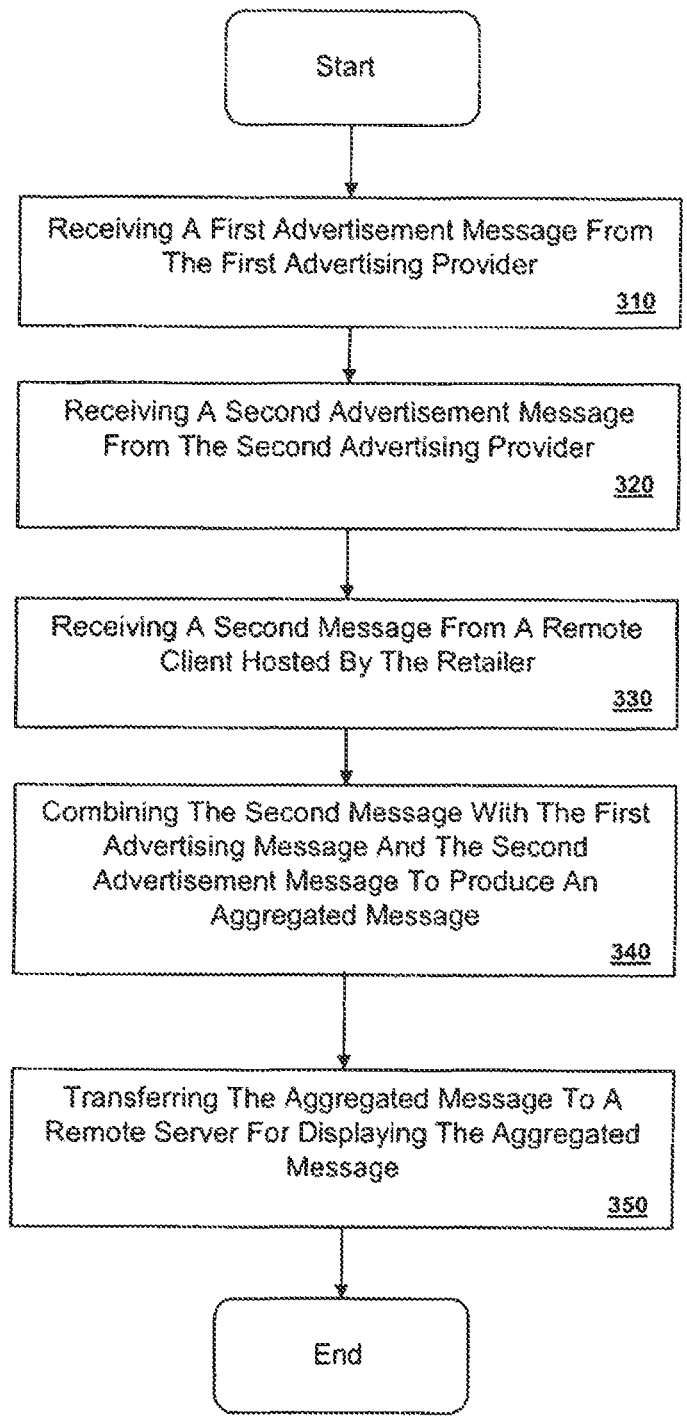
FIG. 3 is a flow diagram of an exemplary embodiment of a process for aggregating content for digital signage and interactive gaming services.

FIG. 3 is a block diagram of an exemplary embodiment of a process for aggregating content for digital signage and interactive gaming services performed by the system. Referring to FIG. 3, processing logic in the system receives a first advertisement message from a first advertising provider (processing block 310). First advertising provider may comprise an alcohol related advertiser. At processing block 320, processing logic in the system receives a second advertisement message from a second advertising provider. The second advertising provider may comprise a non-alcohol related advertiser. Next, at processing block 330, processing logic receives a second message from a remote client located at a retailer. The retailer may be a patron of services provided by the system. Then, processing logic in the system combines the second message with the first advertising message and the second advertisement message to produce an aggregated message (processing block 340). In this manner, the system produces aggregated content that may be displayed. At processing block 350, processing logic in the system transfers the aggregated message to a remote server for displaying the aggregated message. In certain exemplary embodiments, the remote server is located at the retailer.

An Exemplary Computer System

Figure 4:
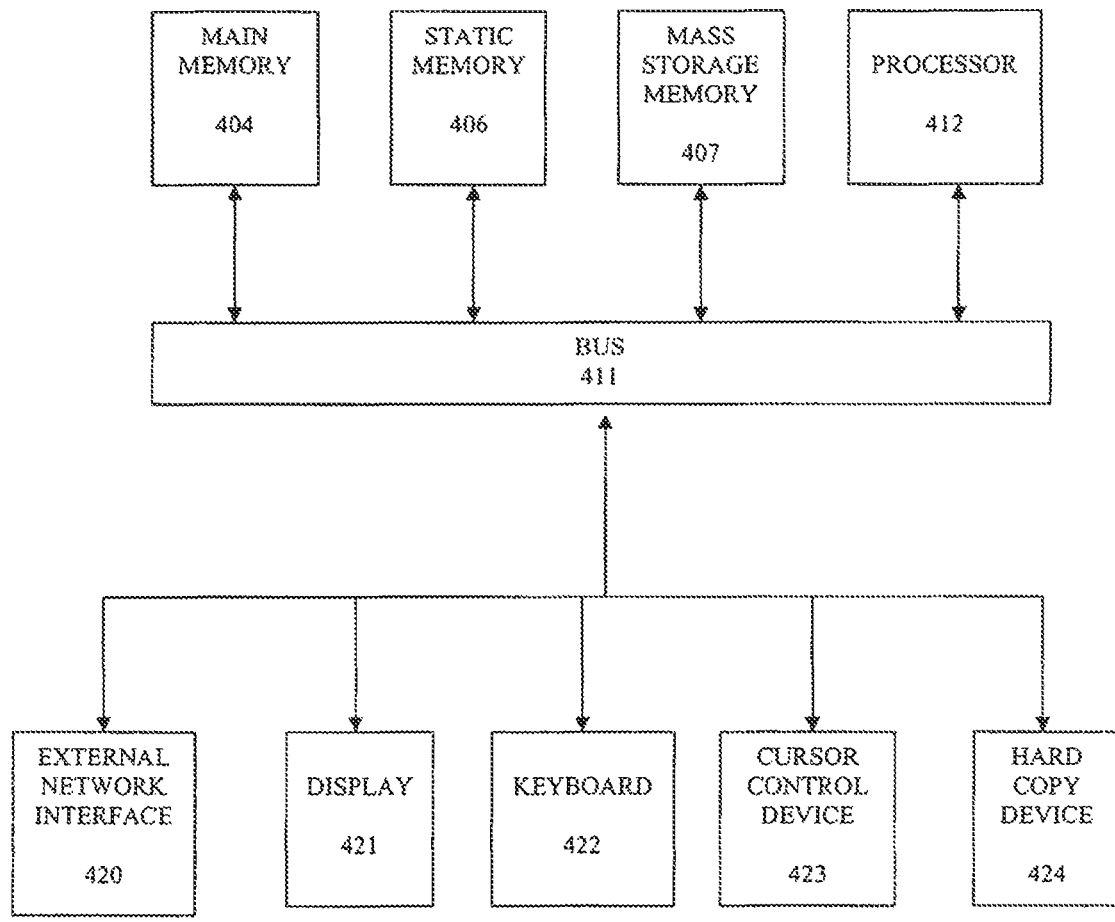
FIG. 4 is an illustrative computer system usable in connection with an exemplary embodiment.

FIG. 4 is a block diagram of a computer system that may perform one or more of the operations described herein according to an exemplary embodiment. Referring to FIG. 4, computer system 400 may comprise an exemplary client or server computer system. Computer system 400 comprises a communication mechanism or bus 411 for communicating information, and a processor 412 coupled with bus 411 for processing information. Processor 412 includes a microprocessor, but is not limited to a microprocessor, such as, for example, Pentium™, PowerPC™, Alpha™, etc.

System 400 further comprises a random access memory (RAM), or other dynamic storage device 404 (referred to as main memory) coupled to bus 411 for storing information and instructions to be executed by processor 412. Main memory 404 also may be used for storing temporary variables or other intermediate information during execution of instructions by processor 412.

Computer system 400 also comprises a read only memory (ROM) and/or other static storage device 406 coupled to bus 411 for storing static information and instructions for processor 412, and a data storage device 407, such as a magnetic disk or optical disk and its corresponding disk drive. Data storage device 407 is coupled to bus 411 for storing information and instructions.

Computer system 400 may further be coupled to a display device 421, such as a cathode ray tube (CRT) or liquid crystal display (LCD), coupled to bus 411 for displaying information to a computer user. An alphanumeric input device 422, including alphanumeric and other keys, may also be coupled to bus 411 for communicating information and command selections to processor 412. An additional user input device is cursor control 423, such as a mouse, trackball, trackpad, stylus, or cursor direction keys, coupled to bus 411 for communicating direction information and command selections to processor 412, and for controlling cursor movement on display 421.

Another device that may be coupled to bus 411 is hard copy device 424, which may be used for marking information on a medium such as paper, film, or similar types of media. Another device that may be coupled to bus 411 is a wired/wireless communication capability 425 to communication to a phone or handheld palm device.

Note that any or all of the components of system 800 and associated hardware may be used in connection with certain exemplary embodiments of the present invention. However, it will be appreciated that other configurations of the computer system may include some or all of the devices.

The processes described herein may be a machine-readable medium having stored thereon data and instructions to cause a programmable processor to perform operations as described above. In certain exemplary embodiments, the operations might be performed by specific hardware components that contain hardwired logic. Those operations might alternatively be performed by any combination of programmed computer components and custom hardware components. As such, the exemplary embodiments described herein may be implemented in connection with any suitable combination of programmed logic circuitry (e.g., hardware, software, firmware, and/or the like).

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), erasable, programmable read-only memories ("EPROMs"), electrically-erasable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that improved keystroke dynamic authentication can also be achieved by software and hardware that distribute the functions of embodiments of this invention differently than herein described. Such variations and implementations are understood to be captured according to the following claims. Furthermore, it will be appreciated that the features, aspects, advantages, and exemplary embodiments described herein may be combined in any combination or sub-combination to yield yet further exemplary embodiments.

It will be appreciated that the fees described above may or may not be charged in certain exemplary embodiments. It also will be appreciated that the same or different fee may be charged to each of the parties that is charged a fee. Indeed, the exemplary embodiments described herein may be extended such to any scheme in which money is taken from patrons and given to retailers, while any money taken from alcohol retailers or manufacturers/distributors does not go to the retailer directly or indirectly (e.g., is not directly or indirectly tied to an alcoholic brand or product).

Also, although certain exemplary embodiments have been described in relation to taking a percentage of the cost of sending a message such as a text message, the present invention is not so limited. For example, the fees that fund the various parties may be generated in whole or in part from any combination of acceptable non-alcohol producing or distributing agent or apparatus such as, for example, a jukebox (e.g., as a portion of the fee charged for playing music), a bar-top device (e.g., as a portion of the fee charged for playing a game), a handheld gaming device, and/or the like. Additionally, the advertisements may be displayed on any acceptable display device including, for example, overhead displays, large televisions, jukeboxes, bar-top devices, handheld gaming devices, etc.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A method of providing advertisements, the method comprising:
   receiving at a data center a first advertisement message from a first advertising provider through a packet data network, the first advertisement message being alcohol-related and being displayable at a display device in retail establishments;
   receiving at the data center a second advertisement message from a second advertising provider through the packet data network, the second advertisement message being unrelated to alcohol and being displayable at one or more display devices in retail establishments for a second fee;
   combining the second advertisement message with the first advertisement message to produce an aggregated message;
   sending the aggregated message from the data center to a display processor via the packet data network; and
   causing the aggregated message to be integrated in a display window with a streaming video signal, using the display processor, such that the aggregated message appears on a portion of the display device in the retail establishment, while the video signal is playing and the retail establishment is selling alcoholic beverages and while complying with legal regulations relating to alcoholic beverages;
   wherein the legal regulations relating to alcoholic beverages pertain to how revenue from alcoholic beverage related advertisements may be shared.

2. The method of claim 1, further comprising:
   receiving at the data center a third message from a remote client at a retail establishment of a retailer located remote from the data center, the third message including content to be displayed on the display device in the retail establishment, wherein the third message is combined with the first advertisement message and the second advertisement message to produce the aggregated message.

3. The method of claim 2, wherein the third message from the remote client in the retail establishment is in response to content seen by the remote client on the display device at the retail establishment.

4. The method of claim 2, wherein receiving the third message from the remote client in the retail establishment comprises:
   receiving, at the data center, the third message, the third message having been forwarded from a telecommunications tower after having being wirelessly sent to said telecommunications tower from the remote client.

5. The method of claim 1, wherein a first service provider and a second service provider share revenue based on the transmission of messages.

6. The method of claim 5, wherein the first service provider comprises an SMS aggregator service provider and the second service provider comprises a telecommunications service provider.

7. The method of claim 1, wherein the first advertisement message is received from an alcoholic beverage advertiser.

8. The method of claim 7, wherein a first advertising fee associated with the first advertisement message from the first advertising provider is not to be distributed to a retailer.

9. The method of claim 1, wherein the first and second advertisement messages are received from the Internet.

10. The method of claim 1, wherein a service fee is collected from a retailer and the first advertisement message is shown on the display device based on advertisement fees.

11. A method of providing advertisements to retail establishments, the method comprising:
    receiving, from a packet data network and at a data center via a computer system including at least one processor, a first set of advertisement messages, each advertisement message in the first set of advertisement messages being displayable at one or more display devices in retail establishments for a first fee;
    receiving, from the packet data network and at the data center via the computer system, a second set of electronic advertisement messages, each said advertisement message in the second set of advertisement messages being unrelated to alcohol and being displayable at one or more display devices in retail establishments for a second fee;
    combining the second set of advertisement messages with the first set of advertisement messages to produce a set of aggregated messages;
    sending the set of aggregated messages to the retail establishment and/or other retail establishments, the set of aggregated messages being integratable in a display window with a streaming video signal,
    collecting, on behalf of the data center, the first fees for advertisement messages in the first set of advertisement messages;
    determining whether each of the first set of advertisement messages is related to alcohol; and
    in response to the determination that one of the first set of advertisement messages is related to alcohol, preventing any portion of the first fee collected for the one of the first set of advertisement messages from being shared with retail establishment(s) at which the associated advertisement messages are displayed in order to comply with legal regulations relating to alcoholic beverages.

12. The method of claim 11, further comprising:
    receiving a third set of messages from one or more individuals at a retail establishment of a retailer located remote from the data center, the third set of messages including content to be displayed on one or more display devices in the retail establishment, wherein the third set of messages is combined with the first set of advertisement messages and the second set of advertisement messages to produce the set of aggregated messages.

13. The method of claim 11, wherein the aggregated messages and the video signal are integratable using a display processor at the retail establishment such that the advertisement messages appear on a portion of a display in the retail establishment while the video signal is playing and the retail establishment is selling alcoholic beverages, and while complying with legal regulations relating to alcoholic beverages.

14. The method of claim 11, further comprising charging a service fee to retail establishment(s) at which the first set of advertisement messages are displayed to compensate the data center for complying with applicable laws regarding alcohol-related advertisements.

15. The method of claim 11, further comprising, in response to the determination that the one of the first set of advertisement messages is related to alcohol, preventing commingling of fees received for in the one of the first set of advertisement messages, with other received fees.

16. The method of claim 11, further comprising collecting fees from patrons at the retail establishments for interacting with display of advertisement messages.

17. The method of claim 16, further comprising sharing a portion of the fees from the patrons with an employee at the respective retail establishment from which the fee was collected.

18. The method of claim 16, further comprising using a portion of the fees from the patrons to provide non-monetary awards/rewards to an employee at the respective retail establishment from which the fee was collected.

19. The method of claim 16, further comprising sharing a portion of the fees from the patrons with the respective retail establishment from which the fee was collected.

20. The method of claim 11, wherein the legal regulations relating to alcoholic beverages pertain to how revenue from alcoholic beverage related advertisements may be shared among different parties involved in such advertisements.

21. An advertising system, comprising:
a data center having at least one processor and being connected to a plurality of retail establishments via respective network connections, wherein the at least one processor is configured to execute instructions for at least:
receiving a first advertisement message from a first advertising provider through a packet data network, the first advertisement message being displayable at one or more display devices in retail establishments for a first fee;
receiving a second advertisement message from a second advertising provider through the packet data network, the second advertisement message being unrelated to alcohol and being displayable at one or more display devices in retail establishments for a second fee;
combining the second advertisement message with the first advertisement message to produce an aggregated message;
sending the aggregated message from the data center to the retail establishment and/or other retail establishments, the aggregated message being integratable in a display window with a streaming video signal;
collecting, on behalf of the data center, the first fee for the first advertisement message;
determining whether the first advertisement message is related to alcohol; and
in response to the determination that the first advertisement message is related to alcohol, preventing any portion of the first fee from being shared with retail establishment(s) at which the associated advertisement messages are displayed,
wherein the collecting, sharing, and preventing enable compliance with legal regulations relating to alcoholic beverages pertaining to how revenue from alcoholic beverage related advertisements may be shared.

22. The system of claim 21, wherein the at least one processor is further configured to receive a third message from a remote client at a retail establishment of a retailer located remote from the data center, the third message including content to be displayed on one or more display devices in the retail establishment, wherein the third message is combined with the first advertisement message and the second advertisement message to produce the aggregated message.

23. The system of claim 21, wherein the aggregated message and the video signal are integratable using a display processor at the retail establishment such that the aggregated message appears on a portion of a display in the retail establishment while the video signal is playing and the retail establishment is selling alcoholic beverages and while complying with legal regulations relating to alcoholic beverages.

24. The system of claim 21, wherein the at least one processor is further configured to enable a service fee to be charged to retail establishment(s) at which the first advertisement message is displayed to compensate the data center for complying with applicable laws regarding alcohol-related advertisements.

* * * * *